United States Patent [19]

Fischer et al.

US005408024A

[11] Patent Number: 5,408,024
[45] Date of Patent: Apr. 18, 1995

[54] RESIN COMPOSITION

[75] Inventors: Stephen A. Fischer, Yardley; David I. Devore, Langhorne, both of Pa.

[73] Assignee: Henkel Corporation, Plymouth Meeting, Pa.

[21] Appl. No.: 212,406

[22] Filed: Mar. 14, 1994

[51] Int. Cl.⁶ .................. C08F 220/58; C08F 228/02; C08F 220/56

[52] U.S. Cl. .................. 526/304; 526/288; 526/303.1

[58] Field of Search ............ 526/304, 288, 303.1

[56] References Cited

U.S. PATENT DOCUMENTS

| | | | |
|---|---|---|---|
| 4,138,446 | 2/1979 | Kawakami et al. | 526/304 |
| 5,116,887 | 5/1992 | Fischer et al. | 523/400 |
| 5,189,142 | 2/1993 | Devore et al. | 528/339.3 |
| 5,239,047 | 8/1993 | Devore et al. | 528/339.3 |

FOREIGN PATENT DOCUMENTS

| | | |
|---|---|---|
| 0508203 | 10/1992 | European Pat. Off. . |
| 2557451 | 6/1976 | Germany . |
| 59-030995 | 2/1984 | Japan . |

*Primary Examiner*—Joseph L. Schofer
*Assistant Examiner*—Wu C. Cheng
*Attorney, Agent, or Firm*—Ernest G. Szoke; Wayne C. Jaeschke; Real J. Grandmaison

[57] ABSTRACT

A resin composition containing from about 10 to 95% by weight of n-methylolacrylamide and from about 5 to 90% by weight of a cationic monomer and optionally a nonionic monomer and/or a difunctional monomer.

13 Claims, No Drawings

RESIN COMPOSITION

BACKGROUND OF THE INVENTION

1. Field of the Invention

The present invention relates to resin compositions which exhibit wet and dry strength properties and contain no organic chlorides.

2. Description of Related Art

Polyamine-epichlorohydrin resins have been used as wet strength resins for paper since the early 1950's. Such resins are cationic and are particularly useful because they are formaldehyde-free and develop wet strength at neutral or alkaline pH values.

One of the drawbacks associated with the use of polyamine-epichlorohydrin resins is the emission of harmful chlorinated compounds into the water systems of pulp and paper mills. These chlorinated compounds, including 1,3 dichloro-2-propanol, epichlorohydrin and 1-chloro-2,3-propanediol, are usually discharged into the effluent waste water systems because they are only partially substantive to cellulose pulp fibers. The permissible amounts of these chlorinated compounds is decreasing and therefore efforts have been made to reduce the amounts of these materials.

Efforts have been made to reduce the amount of organic chloride impurities. For example, Fischer et al., U.S. Pat. No. 5,116,887; European Patent Publication No. 0 508 203; Devore et al., U.S. Pat. Nos. 5,189,142 and 5,239,047; and Fischer et al; U.S. Ser. No. 08/165,779 filed Dec. 10, 1993 disclose low chlorine component polyamine-epichlorohydrin resins produced by modifying the reaction temperature and/or the epichlorohydrin/nitrogen ratio. Nonetheless, some quantity of organic chlorides are produced necessitating expensive and time-consuming disposal.

SUMMARY OF THE INVENTION

The present invention is directed to a resin composition containing no organic chloride by-products. The resin composition of the present invention has excellent dry and wet strength properties and can be used in both acid and alkaline paper slurries.

More specifically, the present invention is directed to a resin composition comprising from about 10 to 95% of n-methylolacrylamide and from about 5 to 90% by weight of a cationic monomer which can be copolymerized with n-methylolacrylamide. The resin composition may optionally contain from about 10 to 85% by weight of a nonionic monomer and from about 0.1 to 3% by weight of a difunctional monomer.

The resin composition of the present invention may be prepared by conventional aqueous polymerization techniques using chain regulators and water soluble polymerization initiators. Resin slurries may be prepared by diluting the resin solutions with water to a concentration of typically less than about 1% by weight. The dilute solution is added to the pulp slurry in an amount to provide from about 0.1 to 5% by weight of the resin based on dry fiber. The pH of the solution can be reduced by the addition of a mineral or organic acid to less than about 3 to increase the reactivity of the resin, if desired.

DETAILED DESCRIPTION OF THE INVENTION

The present invention provides a resin composition that eliminates residual organic chlorides and yet provides favorable dry and wet strength properties to paper.

The resin composition includes from about 10 to 95% by weight of n-methylolacrylamide, preferably from about 30 to 90% by weight. A cationic monomer in an amount of from about 5 to 90% by weight, preferably from about 10 to 40% by weight is also required in the resin composition. As used herein all percentages by weight are based on the total weight of the resin composition.

The preferred cationic monomers include dimethylaminoethyl acrylate or methacrylate dimethylsulfate quaternary salt, dimethylaminoethyl acrylate or methacrylate methyl chloride quaternary salt, dimethyldiallyl ammonium chloride, N-methyl-5-methyl-2-vinyl pyridinium methosulfate, 1,1-dimethyl-1-(2-hydroxypropyl) amine methacrylimide, acryloyloxyethyl dimethyl sulfonium methosulfate, vinyl pyridine, dimethylaminoethyl acrylate or methacrylate, diallyl amine, allyl amine and mixtures thereof. The most preferred cationic monomer is dimethylaminoethyl acrylate dimethylsulfate quaternary salt.

The resin composition may optionally contain from about 10 to 85% by weight of a nonionic monomer, preferably from about 25 to 50% by weight.

The preferred nonionic monomers include acrylamide, dimethylacrylamide, diacetone acrylamide, n-isobutoxyacrylamide and mixtures thereof. The most preferred of the nonionic monomers listed above is acrylamide.

The resin composition may also optionally contain from about 0.1 to 3% by weight of a difunctional monomer, most preferably from about 0.5 to 1.0% by weight. The preferred difunctional monomers are selected from methylene bis-acrylamide, ethylene glycol diacrylate or methacrylate, 1,6-hexanediol diacrylate, 1,3-butylene diacrylate and mixtures thereof. The most preferred difunctional monomer is methylene bis-acrylamide.

A particularly preferred resin composition of the present invention is one comprising about 33% by weight of n-methylolacrylamide, about 33% by weight of acrylamide and about 34% by weight of dimethylaminoethyl acrylate dimethylsulfate quaternary salt.

The resin composition of the present invention is prepared by polymerizing the monomers in an aqueous solution in the optional presence of a chain regulator and water soluble initiator. The preferred chain regulators include sodium hypophosphite, mercaptopropionic acid, higher alkyl mercaptans such as dodecyl mercaptan, polar solvents such as methanol and isopropanol and mixtures thereof. The most preferred chain regulator is sodium hypophosphite.

The preferred polymerization initiators include sodium, ammonium and potassium persulfates, sodium bromate, 2,2-azobis-2-(amidinopropane) dihydrochloride, 2,2-azobis-(N,N'-dimethyleneisobutyramidine) dihydrochloride and mixtures thereof. The most preferred polymerization initiator is sodium persulfate.

The resin composition of the present invention is prepared by forming an aqueous solution containing each of the monomers and then reacting the monomer solution with a solution containing a polymerization initiator such as sodium persulfate.

EXAMPLE 1

A 250 ml round bottom reaction flask was charged with 100.3 g of deionized water and 0.35 g sodium hypophosphite and mixed until uniform. A nitrogen sparge was started and the reactor contents were heated to 80° C. A monomer solution containing 33.9 g of a 50% aqueous solution of acrylamide, 34.7 g of a 48% aqueous solution of n-methylolacrylamide, and 20.8 g of an 80% aqueous solution of dimethylaminoethyl acrylate dimethylsulfate quaternary salt was prepared in a dropping funnel. An initiator solution containing 10 g of a 2.5% sodium persulfate solution was prepared and charged to a syringe for delivery by a micro-pump. The monomer and initiator solutions were simultaneously delivered to the reactor flask at rates in which delivery of the monomer solution was completed in 60 minutes and delivery of the initiator solution completed 30 minutes later. After completion of the addition of the initiator solution, the temperature was held at 80° C. for 30 minutes and then cooled. The resulting terpolymer solution had a solids content of 26.3% by weight, a pH of 2.8, and a Brookfield viscosity (#2/60 rpm @25° C.) of 76 cps.

The performance of the resulting resin composition was determined in accordance with the following.

Commercial bleached kraft stock of about 3% consistency was diluted to 0.2% with water. Blank handsheets were prepared according to the handsheet preparation method outlined in the Mark IV Dynamic Handsheet Mold/Paper Chemistry Jar Assembly operating manual. Treated handsheets were prepared by the same method except the resin composition of the present invention was added as a 0.2% by weight solution at 0.4% by weight resin actives per dry paper weight while the dispersed stock slurry was mixing at 750 rpm. All handsheets were blotted dry between felt cloths. The wet sheets were dried and cured as specified in Tables 1 and 2. Wet tensile strength was measured from 1"×4" strips of the handsheets after soaking in water for 1 hour and dry tensile strength was measured from similar unsoaked strips on an Instron Tester. The results are shown in Tables 1 and 2.

The performance of the resin composition according to the invention is shown in Table 1 and is expressed as a percentage increase over the dry strength of handsheets made without additives (Blank). The data in Table 1 clearly shows that dry tensiles improve when the resin composition according to the invention is added to the stock prior to formation of the sheet. Table 2 shows the percentage increase in wet strength ([wet tensile/dry tensile]×100) over untreated paper and paper treated with a commercially available resin when the composition according to the invention is used to make paper sheets.

EXAMPLE 2

A 250 ml round bottom flask was charged with 90.7 g of deionized water and 0.3 g sodium hypophosphite and mixed until uniform. A nitrogen sparge was started and the reactor contents were heated to 80° C. A monomer solution containing 45.8 g of a 50% aqueous solution of acrylamide, 46.9 g of a 48% aqueous solution of n-methylolacrylamide, and 6.3 g of an 80% aqueous solution of dimethylaminoethyl acrylate dimethylsulfate quaternary salt was prepared in a dropping funnel.

An initiator solution containing 10 g of a 2.5% sodium persulfate solution was prepared and charged to a syringe for delivery by a micro-pump. The monomer and initiator solutions were simultaneously delivered to the reactor at rates in which the monomer solution was completed in 60 minutes and the initiator solution completed 30 minutes later. After completion of the addition of the initiator solution, the temperature was held at 80° C. for 30 minutes and then cooled. The resulting terpolymer solution had a solids content of 27.5% by weight, a pH of 3.2, and a Brookfield viscosity (#2/60 rpm @25° C.) of 1475 cps. The resin composition was tested in the same manner as in Example 1. The results are shown in Table 1.

EXAMPLE 3

A 250 ml round bottom reaction flask was charged with 99.1 g of deionized water and 0.5 g sodium hypophosphite and mixed until uniform. A nitrogen sparge was started and the reactor contents were heated to 80° C. A monomer solution containing 33.9 g of a 50% aqueous solution of acrylamide, 43.7 g of a 48% aqueous solution of n-methylolacrylamide, and 20.8 g of an 80% aqueous solution of dimethylaminoethyl acrylate dimethylsulfate quaternary salt, and 1.0 g methylene bis-acrylamide was prepared in a dropping funnel.

An initiator solution containing 10 g of a 2.5% sodium persulfate solution was prepared and charged to a syringe for delivery by a micro-pump. The monomer and initiator solutions were simultaneously delivered to the reactor at rates in which the monomer solution was completed in 60 minutes and the initiator solution completed 30 minutes later. After completion of the addition of the initiator solution, the temperature was held at 80° C. for 30 minutes and then cooled. The resulting terpolymer solution had a solids content of 26.2% by weight, a pH of 3.0, and a Brookfield viscosity (#2/60 rpm @25° C.) of 123 cps. The resin composition was tested in the same manner as in Example 1. The results are shown in Table 1.

EXAMPLE 4

A 250 ml round bottom reaction flask was charged with 89.4 g of deionized water and 0.5 g sodium hypophosphite and mixed until uniform. A nitrogen sparge was started and the reactor contents were heated to 65° C. A monomer solution containing 93.8 g of a 48% aqueous solution of n-methylolacrylamide and 6.3 g of an 80% aqueous solution of dimethylaminoethyl acrylate dimethylsulfate quaternary salt was prepared in a dropping funnel.

An initiator solution containing 10 g of a 2.5% sodium persulfate solution was prepared and charged to a syringe for delivery by a micro-pump. The monomer and initiator solutions were simultaneously delivered to the reactor at rates in which the monomer solution was completed in 60 minutes and the initiator solution completed 30 minutes later. After completion of the addition of the initiator solution, the temperature was held at 65° C. for 30 minutes and then cooled. The resulting copolymer solution had a solids content of 26.9% by weight, a pH of 2.8, and a Brookfield viscosity (#2/60rpm @25° C.) of 62.5 cps. The resin composition was tested in the same manner as in Example 1. The results are shown in Table 1.

TABLE 1[1]

| Sample | % Increase Dry Tensile (over Blank) |
| --- | --- |
| Example 1 | 29 |
| Example 2 | 26 |
| Example 3 | 16 |

TABLE 1-continued

| Sample | % Increase Dry Tensile (over Blank) |
|---|---|
| Example 4 | 25 |

[1]Handsheets cured at 70° C. for 16 hours at 50% relative humidity.

TABLE 2[1]

| Sample | Dry Tensile psi | Wet Tensile psi | % Increase in Wet Strength[4] |
|---|---|---|---|
| Blank | 11.1 | 0.34 | 3.1 |
| Example 1 | 11.6 | 2.30 | 20.1 |
| Fibrabon 33[2] | 14.5 | 2.57 | 17.8 |
| Fibrabon 35[3] | 12.9 | 1.75 | 13.7 |

[1]Handsheets cured for 16 hours at 95° C. at 50% relative humidity.
[2]Polyaminoamide-Epichlorohydrin Resin (Henkel Corporation).
[3]Polyamine-Epichlorohydrin Resin (Henkel Corporation).
[4]% increase in wet strength = (wet tensile/dry tensile) × 100.

As shown in Table 1 the dry tensile strength of paper treated with the resin composition of Examples 1 to 4 of the present invention shows significant improvement over untreated paper.

What is claimed is:

1. A resin composition comprising from about 10 to about 95% by weight of n-methylolacrylamide, from about 5 to about 90% by weight of a cationic monomer, and from about 0.1 to about 3% by weight of a difunctional monomer, based on the total weight of the resin composition.

2. The resin composition of claim 1 wherein the amount of the difunctional monomer is from about 0.5 to about 1.0% by weight.

3. The resin composition of claim 1 wherein the cationic monomer is selected from the group consisting of dimethylaminoethyl acrylate or methacrylate dimethylsulfate quaternary salt, dimethylaminoethyl acrylate or methacrylate methyl chloride quaternary salt, dimethyldiallyl ammonium chloride, N-methyl-5-methyl-2-vinyl pyridinium methosulfate, 1,1-dimethyl-1-(2-hydroxypropyl) amine methacrylimide, acryloyloxyethyl dimethyl sulfonium methosulfate, vinyl pyridine, dimethylaminoethyl acrylate or methacrylate, diallyl amine, allyl amine and mixtures thereof.

4. The resin composition of claim 1 wherein the cationic monomer comprises dimethylaminoethyl acrylate dimethylsulfate quaternary salt.

5. The resin composition of claim 1 wherein the difunctional monomer is selected from the group consisting of methylene bis-acrylamide, ethylene glycol diacrylate, ethylene glycol methacrylate, 1,6-hexanediol diacrylate, 1,3-butylene diacrylate and mixtures thereof.

6. The resin composition of claim 5 wherein the difunctional monomer comprises methylene bis-acrylamide.

7. A resin composition comprising about 33% by weight of n-methylolacrylamide, about 33% by weight of acrylamide and about 34% by weight of dimethylaminoethyl acrylate dimethylsulfate quaternary salt.

8. The resin composition of claim 7 further containing from about 10 to about 85% by weight of a nonionic monomer, based on the weight of said resin composition.

9. The resin composition of claim 8 wherein said nonionic monomer is selected from the group consisting of acrylamide, dimethylacrylamide, diacetone acrylamide, n-isobutoxyacrylamide and mixtures thereof.

10. The resin composition of claim 7 further containing from about 0.1 to about 3% by weight of a difunctional monomer, based on the weight of said resin composition.

11. The resin composition of claim 10 wherein said difunctional monomer is selected from the group consisting of methylene bis-acrylamide, ethylene glycol diacrylate, ethylene glycol methacrylate, 1,6-hexanediol diacrylate, 1,3-butylene diacrylate and mixtures thereof.

12. The resin composition of claim 1 further containing from about 10 to about 85% by weight of a nonionic monomer.

13. The resin composition of claim 12 wherein the nonionic monomer is selected from the group consisting of acrylamide, dimethylacrylamide, diacetone acrylamide, n-isobutoxyacrylamide and mixtures thereof.

* * * * *